United States Patent
Sakakura et al.

(10) Patent No.: US 12,266,391 B2
(45) Date of Patent: Apr. 1, 2025

(54) METHOD AND SYSTEM FOR WRITING VOXELS TO A TRANSPARENT SUBSTRATE

(71) Applicant: Microsoft Technology Licensing, LLC, Redmond, WA (US)

(72) Inventors: Masaaki Sakakura, Cambridge (GB); Timothy John Deegan, Cambridge (GB); Rokas Drevinskas, Cambridge (GB); Thomas Torsten Dr Winkler, Cambridge (GB); Daniel Jonathan Finchley Cletheroe, Cambridge (GB); Richard John Black, Cambridge (GB); Patrick Neil Anderson, Cambridge (GB); Austin Nicholas Donnelly, Cambridge (GB); Ioan Alexandru Stefanovici, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/194,161

(22) Filed: Mar. 31, 2023

(65) Prior Publication Data

US 2024/0331731 A1     Oct. 3, 2024

(51) Int. Cl.
*G11B 7/127* (2012.01)

(52) U.S. Cl.
CPC .................. *G11B 7/127* (2013.01)

(58) Field of Classification Search
CPC . G11B 7/127; G11B 7/24044; G11B 7/00456; G11B 7/1353; G11B 2007/0009
See application file for complete search history.

(56) References Cited

U.S. PATENT DOCUMENTS

| 5,136,152 A | 8/1992 | Lee |
| 5,703,848 A | 12/1997 | Hofer |

(Continued)

FOREIGN PATENT DOCUMENTS

| CN | 101794587 A | 8/2010 |
| CN | 106716226 A | 5/2017 |

(Continued)

OTHER PUBLICATIONS

Non-Final Office Action mailed on Nov. 30, 2023, in U.S. Appl. No. 18/194,231, 07 pages.

(Continued)

*Primary Examiner* — Andrew Sasinowski
(74) *Attorney, Agent, or Firm* — Alleman Hall & Tuttle LLP

(57) ABSTRACT

A method of writing voxels to a substrate using a laser writing system comprises forming a first voxel at a first position in a substrate using a first laser pulse; detecting light emitted or scattered by the substrate as a result of forming the first voxel; determining whether the detected light satisfies a predetermined constraint; and, when the detected light does not satisfy the predetermined constraint, adjusting an amplitude of a second laser pulse. Light emission or scattering from the substrate as a result of forming a voxel is related to the properties of the formed voxel. By monitoring such emission or scattering, it is made possible to compensate for variations in performance of the laser writing system. Also provided herein are a laser writing system and computer program product which implement the method.

20 Claims, 9 Drawing Sheets

(56) References Cited

U.S. PATENT DOCUMENTS

| | | | |
|---|---|---|---|
| 6,118,756 | A | 9/2000 | Masuhara et al. |
| 6,940,801 | B1 | 9/2005 | Ishii et al. |
| 10,181,336 | B1 | 1/2019 | Georgiou et al. |
| 10,236,027 | B1 * | 3/2019 | Georgiou ................. G03H 1/26 |
| 10,672,428 | B1 | 6/2020 | Black et al. |
| 10,719,239 | B2 | 7/2020 | Rowstron et al. |
| 10,768,825 | B2 | 9/2020 | Rowstron et al. |
| 10,970,363 | B2 | 4/2021 | Stefanovici et al. |
| 11,571,336 | B2 | 2/2023 | Knox |
| 2004/0013064 | A1 | 1/2004 | Udagawa et al. |
| 2004/0240337 | A1 | 12/2004 | Akkermans |
| 2007/0115774 | A1 | 5/2007 | Hagiwara |
| 2008/0285399 | A1 | 11/2008 | Kobayashi |
| 2009/0245048 | A1 | 10/2009 | Ueda et al. |
| 2010/0046345 | A1 | 2/2010 | Fujita et al. |
| 2010/0124160 | A1 | 5/2010 | Kamiguchi |
| 2010/0187208 | A1 | 7/2010 | Dantus et al. |
| 2011/0019511 | A1 * | 1/2011 | Fort ....................... B82Y 10/00 369/13.14 |
| 2012/0069722 | A1 | 3/2012 | Miura |
| 2015/0277551 | A1 | 10/2015 | Travis |
| 2019/0262936 | A1 | 8/2019 | Kobayashi |
| 2021/0124889 | A1 | 4/2021 | Adrian et al. |
| 2022/0111470 | A1 | 4/2022 | Kazansky |
| 2022/0268983 | A1 * | 8/2022 | Sakakura ............ C03C 23/0025 |
| 2022/0415351 | A1 * | 12/2022 | Singer ................ G11B 7/24065 |
| 2023/0204969 | A1 | 6/2023 | Sun |

FOREIGN PATENT DOCUMENTS

| | | | |
|---|---|---|---|
| EP | 1063645 | A2 | 12/2000 |
| GB | 2592386 | A | 9/2021 |
| JP | 2002264515 | A | 9/2002 |
| WO | 2019079076 | A1 | 4/2019 |
| WO | 2019156740 | A1 | 8/2019 |
| WO | 2019158910 | A1 | 8/2019 |
| WO | 2020109767 | A1 | 6/2020 |
| WO | 2020109768 | A1 | 6/2020 |
| WO | 2020226746 | A1 | 11/2020 |
| WO | 2021155826 | A1 | 8/2021 |

OTHER PUBLICATIONS

"International Search Report and Written Opinion Issued in PCT Application No. PCT/US20/021926", Mailed Date: Jun. 26, 2020, 11 Pages.

"Notice of Allowance Issued in China Patent Application No. 202080034325.5", Mailed Date: Mar. 8, 2023, 4 Pages.

"Notice of Allowance Issued in South African Patent Application No. 2021/07557", Mailed Date: Nov. 9, 2022, 1 Page.

"Notice of Allowance Issued in U.S. Appl. No. 16/408,374", Mailed Date: Feb. 6, 2020, 9 Pages.

"Office Action and Search Report Issued in China Patent Application No. 202080034325.5", Mailed Date: Oct. 8, 2022, 15 Pages.

Chen, Zhihui, "Preparation of Ferroelectric Thin Films and Research on New Ferroelectric Memory", In China Outstanding Doctoral Dissertation, May 20, 2015, 127 Pages.

International Search Report and Written Opinion received for PCT Application No. PCT/US2024/019618, Jul. 8, 2024, 19 pages.

Invitation To Pay Additional Fees received for PCT Application No. PCT/US2024/019619, Jul. 8, 2024, 11 pages.

Notice of Allowance mailed on May 9, 2024, in U.S. Appl. No. 18/194,231, 07 pages.

"Application as Filed in U.S. Appl. No. 17/804,368", filed May 27, 2022, 40 Pages.

Anderson, et al., "Glass: A New Media for a New Era?", In Proceedings of 10th USENIX Workshop on Hot Topics in Storage and File Systems, HotStorage, Jul. 9, 2018, 6 Pages.

Bomzon, et al., "Pancharatnam-Berry Phase in Space-variant Polarization-state Manipulations with Subwavelength Gratings", In Journal of Optics Letters, vol. 26, Issue 18, Sep. 15, 2001, pp. 1424-1426.

Cheng, et al., "Demonstration of High-density Three Dimensional Storage in Fused Silica by Femtosecond Laser Pulses", In Journal of Applied Physics, vol. 94, Issue 3, Aug. 1, 2003, pp. 1304-1307.

Glezer, et al., "Three-dimensional Optical Storage Inside Transparent Materials", In Journal of Optics Letters, vol. 21, Issue 24, Dec. 15, 1996, pp. 2023-2025.

Imai, et al., "100-Layer Recording in Fused Silica for Semi Permanent Data Storage", In Japanese Journal of Applied Physics, vol. 54, Aug. 25, 2015, pp. 1-5.

Minn, et al., "A Robust Timing and Frequency Synchronization for OFDM Systems", In Journal of IEEE Transactions on Wireless Communications, vol. 2, Issue 4, Jul. 4, 2003, pp. 822-839.

Shiozawa, et al., "Simultaneous Multi -Bit Recording in Fused Silica for Permanent Storage", In Japanese Journal of Applied Physics, vol. 52, Sep. 20, 2013, pp. 1-4.

Sopena, et al., "Ultrafast Laser Stabilization by Nonlinear Absorption for Enhanced-precision Material Processing", In Journal of the Optics Letters, vol. 47, Issue 4, Feb. 15, 2022, pp. 993-996.

Strickler, et al., "Three-dimensional Optical Data Storage in Refractive Media by Two-photon Point Excitation", In Journal of Optics Letters, vol. 16, Issue 22, Nov. 15, 1991, pp. 1780-1782.

Watanabe, et al., "Transmission and Photoluminescence Images of Three-dimensional Memory in Vitreous Silica", In Journal of Applied Physics Letters, vol. 74, Issue 26, Jun. 28, 1999, pp. 3957-3959.

"Does Light Change Phase on Refraction?", Retrieved from: https://physics.stackexchange.com/questions/150661/does-light-change-phase-on-refraction, Dec. 5, 2014, 4 Pages.

"Glass-Ceramic", Retrieved from: https://en.wikipedia.org/wiki/Glass-ceramic#, Apr. 8, 2023, 6 Pages.

"Application as Filed in U.S. Appl. No. 18/158,582", filed Jan. 24, 2023, 56 Pages.

Halliday, et al., "Fundamentals of Physics, 7th Extended Edition", Published by John Wiley & Sons, 2005, pp. 960-961.

Murphy, Douglas B. , "Differential Interference Contrast (DIC) Microscopy and Modulation Contrast Microscopy", Published in book Fundamentals of Light Microscopy and Electronic Imaging, 2001, pp. 153-168.

Yu, et al., "CS50's Introduction to Artificial Intelligence with Python", Retrieved from: https://cs50.harvard.edu/ai/2020/notes/3/, 2023, 16 Pages.

Zhang, et al., "Three-Dimensional Holographic Parallel Focusing with Feedback Control for Femtosecond Laser Processing", In Journal of Optics and Lasers in Engineering, vol. 151, Apr. 1, 2022, 7 Pages.

International Search Report and Written Opinion received for PCT Application No. PCT/US2024/019619, Aug. 30, 2024, 20 pages.

International Search Report and Written Opinion received for PCT Application No. PCT/US2024/019819, Jul. 8, 2024, 17 pages.

Notice of Allowance mailed on Aug. 7, 2024, in U.S. Appl. No. 18/194,113, 05 pages.

Notice of Allowance mailed on Apr. 24, 2024, in U.S. Appl. No. 18/194,113, 09 pages.

* cited by examiner

METHOD AND SYSTEM FOR WRITING VOXELS TO A TRANSPARENT SUBSTRATE

BACKGROUND

There is substantial demand for data storage. It is estimated that cloud storage providers will in the near future need data storage capacities of the order of zettabytes, a zettabyte being one trillion gigabytes ($10^{21}$ bytes). Much of the data will need to be stored for extended periods of time.

Examples of data storage technologies currently in widespread use include hard disk drives, magnetic tape, flash memory, and optical discs. All of these technologies have drawbacks which require data to be periodically copied onto replacement media. This is costly in terms of both energy usage and hardware requirements.

Magnetic storage media such as hard drives and magnetic tape suffer from gradual demagnetization. Flash memory is subject to read disturb effects, where repeatedly reading from a particular flash cell causes failure of surrounding flash cells. The reflective materials used for data storage in optical media such as DVDs degrade over time.

Birefringent optical data storage media have been proposed as a solution to these drawbacks. A birefringent optical data storage medium comprises a substrate, such as a quartz glass substrate. Data are encoded in 3-dimensional nanostructures formed in the substrate. These nanostructures are referred to as voxels.

A voxel has optical properties which differ from those of the surrounding bulk substrate. In particular, voxels are birefringent, and in other words display different refractive indices depending upon the polarization and/or direction of incident light. The optical properties of the voxels can be controlled at the time the voxels are written into the substrate. The optical properties of the voxels are used to encode data.

The substrate is transparent, in the sense of being transparent to light at the wavelength(s) used to read and write the voxels.

Birefringent optical data storage media and their manufacture have been described by e.g. Anderson et al, Glass: A New Media for a New Era? 10th USENIX Workshop on Hot Topics in Storage and File Systems (HotStorage 18), 2018; and in U.S. Pat. No. 10,236,027 B1.

SUMMARY

In one aspect, there is provided a method of writing voxels to a substrate using a laser writing system. The method comprises forming a first voxel at a first position in a substrate using a first laser pulse; detecting light emitted or scattered by the substrate as a result of forming the first voxel; determining whether the detected light satisfies a predetermined constraint; and, in response to determining that the detected light does not satisfy the predetermined constraint, adjusting an amplitude of a second laser pulse.

A related aspect provides a computer program product comprising instructions embodied on a non-transitory computer-readable medium which, when executed by one or more processors operably linked to a laser writing system for writing voxels to a transparent storage medium, causes the laser writing system to perform the above method.

Still another aspect provides a system for writing data to a transparent substrate. The system comprises a pulsed laser source; a first amplitude modulator downstream of the pulsed laser source along an optical path; a beam scanner arranged on the optical path downstream of the first amplitude modulator; a sample stage to hold a substrate on the optical path, downstream of the movable optic and amplitude modulator; a detector to detect light emitted or scattered by the substrate as a result of formation of a voxel in the substrate by the modulated laser pulse; and a controller. In use, the controller controls the system to perform a method as defined herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION

Directional terms such as "top", "bottom", "left", "right", "above", "below", "horizontal" and "vertical" are used herein for convenience of description and refer to the orientation shown in the figure of the drawings under discussion. For the avoidance of any doubt, this terminology is not intended to limit the orientation of the device in an external frame of reference.

Positions of voxels within a substrate may be described using Cartesian x, y, z coordinates. Laser pulses used to form the voxels propagate in the z-axis direction.

Data processing steps are implemented using hardware, e.g. a processing apparatus such as processing apparatus 810, a digital or analogue signal processor, or other appropriate circuitry.

Figure 1:
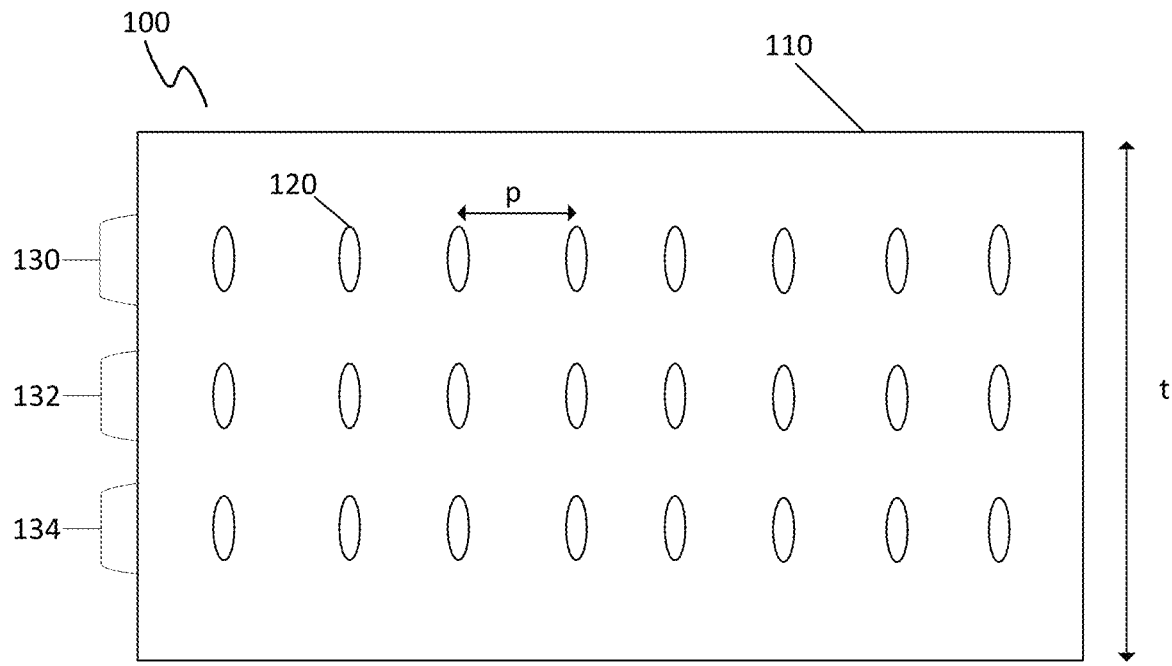
FIG. 1 is a schematic cross-section of an example optical data storage medium.

The structure of an example optical data storage medium will first be explained with reference to FIG. 1, which is a schematic cross-section of the optical data storage medium.

The optical data storage medium 100 comprises a substrate 110 having voxels 120 embedded therein.

The substrate 110 may comprise glass, in particular fused quartz. Fused quartz may also be referred to as silica glass. Glass has excellent chemical stability, and data storage media based on glass substrates have an expected lifespan extending to hundreds of years. As such, optical data storage media are useful for long-term archival of data.

The shape and dimensions of the substrate are not particularly limited. FIG. 1 illustrates a cuboid substrate. In variants, the substrate may have any shape (e.g., cylindrical).

The substrate typically has a thickness t of up to 10 mm, optionally up to 5 mm, further optionally in the range 200 µm to 2 mm in the z direction. More generally, the thickness of the substrate may be selected as appropriate based on the capabilities of the imaging system to be used to image the voxels. The z direction is the direction in which light will be transmitted through the substrate when imaging the voxels. Attenuation of light passing through the substrate increases as a function of the distance travelled, and providing a relatively thin substrate may limit such attenuation.

A plurality of voxels 120 is embedded in the substrate 110. The voxels 120 may comprise phase voxels and/or birefringent voxels.

A voxel is a discrete volume of the substrate which has been modified to have one or more non-native optical properties, in other words, one or more optical properties which differ from those of bulk substrate material.

Voxels are formed by focusing one or more pulses of laser light at a location in the substrate 110. The pulse(s) induce a physical change in the structure of the material at that location. The physical change may comprise the creation of a densified or rarefied area; a local glass-matrix change; crystallization; and the formation of nanoscopic voids.

A phase voxel is a voxel having a refractive index which differs from the refractive index of unmodified bulk substrate material. A phase voxel is so called because electromagnetic waves (i.e., light) passing through the voxel undergo a change in phase. A phase voxel is obtainable by focusing a single laser pulse at the location of the voxel, though multiple laser pulses (e.g., from a GHz burst laser) may be used if desired.

Phase voxels may be used to implement a simple 1-bit encoding scheme: the presence and absence of a voxel may respectively be interpreted as a logical 1 and a logical 0, or vice versa.

Phase voxels may alternatively be used to implement a multi-bit encoding scheme. The magnitude of the phase shift induced as light passes through a phase voxel is referred to as the "strength" of the voxel. The strength is determined by the refractive index of the phase voxel, and the size of the voxel (more specifically, the path length through the voxel).

The strength of a phase voxel varies as a function of the amplitude (in other words, energy) of the laser pulse used to write the voxel. By modulating the amplitude of the laser pulse, phase voxels having different strengths may be obtained. Each different strength may be taken to encode a different symbol. Such voxels are referred to as amplitude-modulated phase voxels.

A pair of phase voxels are considered to have "different" strengths when the voxels cause phase changes which are sufficiently different to be useful to encode different data symbols. A difference is above the noise floor of the writing system, such that random fluctuations (e.g., in laser power output) do not cause incorrect symbols to be written to the substrate. A difference is also large enough to be resolved by a phase-sensitive microscope. De minimis fluctuations in strength due to random noise are not considered to be "differences" in the context of the present application.

A birefringent voxel is a voxel having a non-native birefringence, i.e. a birefringence which differs from that of the bulk material. A birefringent voxel exhibits different refractive indices for light of different polarizations.

A birefringent voxel causes a change in the angle of polarization of the light. A birefringent voxel has a linear retardance, which is a measure of the magnitude of the shift between orthogonal linear polarization components of light when the light interacts with the birefringent voxel. Linear retardance is a consequence of the birefringence, and has a magnitude related to the birefringence and size of the voxel.

Typically, a birefringent voxel is formed by focusing at least two laser pulses at the location of the voxel. The first laser pulse is a relatively-high amplitude pulse, referred to as a seed pulse. The seed pulse causes formation of a seed modification. The seed pulse is followed by one or more data pulses of relatively low amplitude. The data pulse(s) have polarizations which determine the birefringence of the birefringent voxel. By modulating the polarization of the data pulse(s), voxels may be obtained which have different birefringence properties and hence encode different data symbols.

A seed modification is similar in structure to a phase voxel. When writing a plurality of phase voxels, laser pulse energy is modulated such that different phase voxels have different strengths. When forming a plurality of seed modifications, laser pulse energy remains nominally constant such that the seed modifications are of equal strengths to within a tolerance.

Alternatively, voxels having differing birefringence properties may be obtained using a single laser pulse if the shape of the laser beam is modulated.

Other parameters, such as voxel position (e.g., distance from a reference location or reference axis), may alternatively or additionally be modulated to encode data.

In the illustrated example, the voxels 120 are arranged as a stack of layers. The stack comprises a top layer 130, an intermediate layer 132, and a bottom layer 134. Any number of layers of voxels may be present. For example, an optical data storage medium may include from 1 to 100 layers of voxels, or even more.

Voxels within a layer may be separated from each other laterally. The distance between neighboring voxels within a layer may be referred to as the pitch, p. In general, the more closely spaced the voxels, the greater the density of data which may be stored in the optical data storage medium per unit area. At least in the case of amplitude-modulated phase voxels, voxels may be shingled, i.e. partially overlapping in space.

The amount of data which may be stored in an optical data storage medium is, in part, determined by the number of bits which may be stored per voxel. The number of bits per voxel is determined by the number of discrete voxel states which can be written reliably to the transparent substrate. To allow data to be retrieved, that states must be distinguishable from one another after accounting for the effects of fluctuations in the properties of the write system.

There are many possible factors which may lead to fluctuations. Fluctuations may be spatial, temporal, or spatiotemporal.

Example sources of spatial fluctuations include focusing aberrations and component misalignment. In particular, the efficiency of pulse delivery often varies as a function of the position of the write system's beam scanner. Temporal fluctuations include changes in laser intensity due to warm-up of the laser source, changes to transmissivity or reflectivity of optical components, and changes to alignment of components due to thermal expansion or effects of vibration.

One approach to mitigating fluctuations comprises measuring the intensity of light emitted by the laser source using a beam sampler, and adjusting power output of the laser source based on the measured intensity. Consistent measurement of the intensity is difficult for optical systems which include a scanner and/or polarization modulator, since different laser pulses will arrive at different locations on the beam sampler's photodetector. The effectiveness of this approach is therefore somewhat limited.

Provided herein is a method of writing voxels to a transparent substrate which may allow for improved reproducibility of voxels. In the method, photo-induced emissions from the substrate and/or light scattering by the substrate are monitored when forming a voxel. The energy of the laser pulses used to form the voxels is tuned based on the detected emission or scattering. By directly monitoring effects on the substrate, it may be made possible to compensate for fluctuations arising from any or all components of the write system.

Though the examples are described with particular reference to monitoring photo-induced emissions resulting from voxel formation, light scattering as a result of voxel formation may alternatively or additionally be monitored.

Further, the examples are described with reference to formation of voxels within a transparent substrate. The use of a transparent substrate may allow multiple layers of voxels to be formed, thereby allowing increases in data density per unit volume. The described methods are however equally applicable to formation of voxels at a surface, e.g. at a surface of an opaque substrate.

An example method will now be described with reference to FIG. 2, which is a flow diagram outlining the method.

At block 201, a first voxel is formed at a first position in a substrate using a first laser pulse.

The substrate is most typically a transparent substrate. The transparent substrate may comprise a glass, a glass-ceramic, or an organic polymer. In particular, the substrate may comprise a glass, such as fused quartz.

Alternatively, the substrate may be an opaque substrate.

When the substrate is a transparent substrate, the first position may be within or at a surface of the substrate. When the substrate is an opaque substrate, the first position is at a surface of the substrate.

The first voxel may be a phase voxel. When multiple phase voxels are to be written to the transparent substrate, laser pulse energy may be modulated resulting in two or more phase voxels which encode different data symbols.

The first voxel may be a birefringent voxel. In such implementations, the method may be applied when forming the seed modification using a seed pulse and/or when applying one or more data pulses to a seed modification to convert the seed modification into a birefringent voxel.

At block 202, light emitted or scattered by the transparent substrate as a result of forming the first voxel is detected. This operation may, in particular, comprise determining an intensity of the emitted or scattered light.

Forming a voxel in a transparent substrate using a laser pulse results in photo-induced emission by the substrate material at the location of the voxel. The photo-induced emission may, for example, be the result of fluorescence, plasma formation, and/or black body radiation. Light may be emitted over a range of wavelengths, often at wavelengths in the range 200 nm to 3000 nm. A color filter may be used to separate light generated by photo-induced emission from light emitted by the laser source.

It has been found that the amplitude of the photo-induced emission is correlated with the extent of the modification to the substrate material. Generally, the amplitude of photo-induced emission increases with voxel strength.

At block 203, it is determined whether the detected light satisfies a predetermined constraint. For example, it may be determined whether the intensity of the emitted light falls within a predetermined range, the predetermined range corresponding to a target voxel strength.

The operations of this block may be implemented using a computer.

Subsequently, at block 204, the amplitude of a second laser pulse is adjusted in response to determining that the detected light does not satisfy the predetermined constraint.

The second laser pulse may be for forming a second voxel. The second voxel may be formed at a second position which is in the same substrate as the first position. Alternatively, the second voxel may be formed in a different substrate.

Alternatively, the second laser pulse may be a data pulse for converting the first voxel from a seed modification to a birefringent voxel.

The adjustment may be an increase or a decrease of the amplitude, depending upon whether the voxel formed at block 201 was too strong (usually corresponding to the intensity of the detected light falling below a lower limit of the predetermined range) or too weak (usually corresponding to the intensity of the detected light being above the upper limit of the predetermined range).

Adjusting the amplitude of the light may comprise adjusting an output power of the laser, and/or adjusting an intensity modulator associated with the laser. The intensity modulator may comprise an intensity attenuator. Examples of intensity attenuators include an acousto-optic deflector or the combination of an electro-optic modulator and a polarizer. Alternatively or additionally, the intensity modulator may comprise an amplifier.

Figure 2:
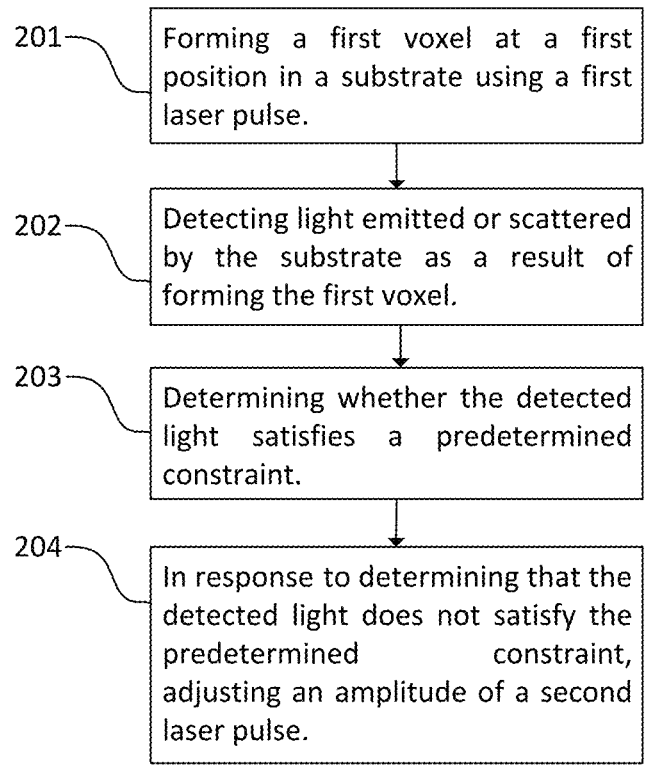
FIG. 2 is a flow diagram outlining a method of writing voxels to a transparent substrate.

Implementations of the method of FIG. 2 may allow for correction of repeatable systematic errors in a laser writing system.

Figure 3A:
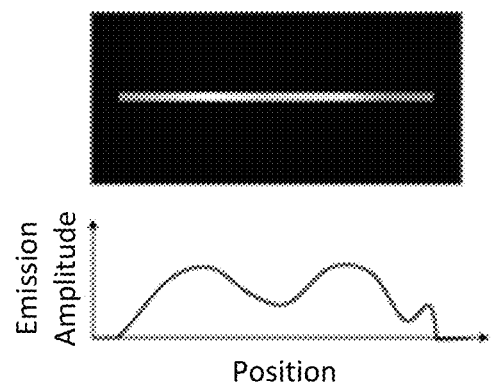
FIG. 3A an image of light emissions resulting from formation of a scanline of a voxels, along with a plot of measured emission amplitude as a function of position along the scanline.

Repeatable systematic errors may include spatial variations. For example, voxel strength may vary with position along a scan line, as illustrated in FIG. 3A. FIG. 3A shows an image of light emissions resulting from formation of a scanline of a voxels, along with a plot of measured emission amplitude as a function of position along the scanline.

A typical laser writing system includes a beam scanner. The beam scanner is one potential source of spatial variations. This is because laser pulses follow different optical paths through the system depending upon the orientation of the beam scanner. For example, different laser pulses may have different path lengths and/or pass through different points on one or more optical components. Example 1 further below provides a more detailed discussion of how a beam scanner can cause spatial variations, using the example of a polygon scanner.

Therefore, repeatable systematic errors may be associated with the position in the substrate at which the laser writing system is targeted.

Other operating parameters may contribute to repeatable systematic errors. This is illustrated in FIG. 3B, which is a plot of photo-induced emission amplitude as a function of position along a scan line using laser pulses of different energies.

Figure 3B:
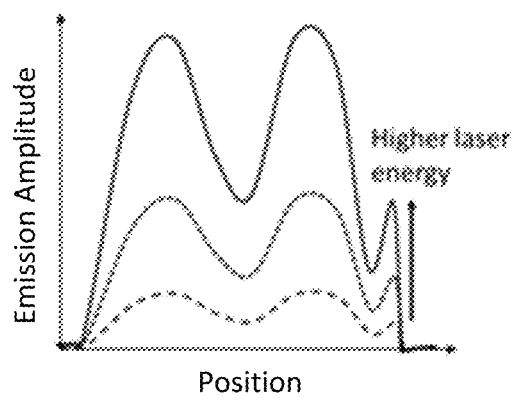
FIG. 3B is a plot of photo-induced emission amplitude as a function of position along a scan line using laser pulses of different energies.

FIG. 3B shows that the systematic errors in this example had a spatial component: peaks in the emission amplitude curves are observed at approximately the same position regardless of laser pulse energy. However, in the illustrated example, variations became more pronounced for higher energy laser pulses.

To allow correction of repeatable systematic errors, variants of the method of FIG. 2 may comprise generating a calibration model. The calibration model associates a state of the laser writing system with a correction to apply to the amplitude of light output by the laser. Then, during a voxel writing process, the corrections are applied.

A "state" comprises values describing at least one operating parameter of the laser writing system. It may be preferable for the state to represent as many operating parameters as possible.

By way of illustration, the state may comprise values representing one or more of a laser power output, an attenuator setting, an amplifier setting, a spatial light modulator setting, an orientation of a beam scanner, orientation of a moveable mirror, focus of a variable focus lens, and/or a position of a sample stage of the laser writing system.

In particular, the state may describe at least one operating parameter of a beam scanner of the laser writing system.

Alternatively or additionally, the state may describe a target location in a transparent substrate for example, using one or more coordinates.

The state may further comprise values of extrinsic parameters, describing an operating environment of the laser writing system. Examples of extrinsic parameters include ambient temperature, humidity, and the like.

Figure 4:
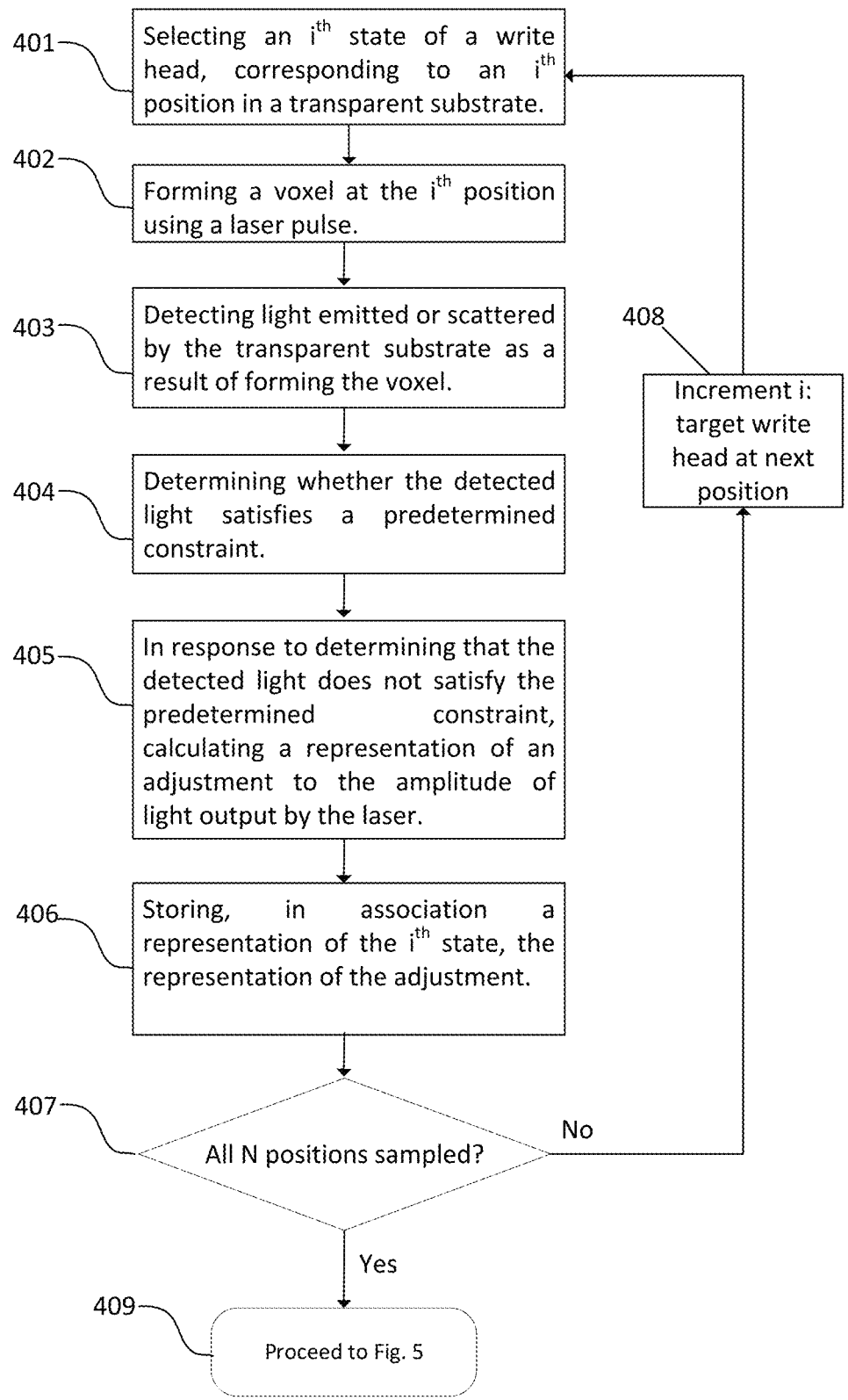
FIG. 4 is a flow diagram outlining a calibration phase of a method for writing voxels, which method is adapted to allow for correction of repeatable systematic errors.
Figure 5:
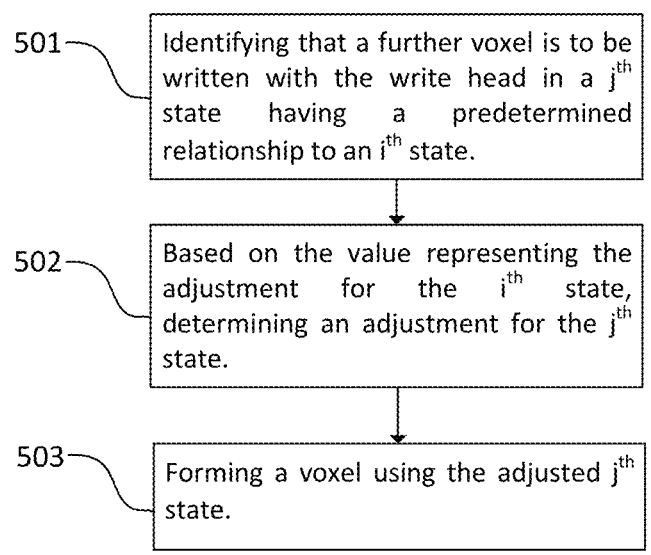
FIG. 5 is a flow diagram outlining a voxel writing phase which may be performed subsequent to the method of FIG. 4.

An example method which is adapted to compensate for repeatable systematic errors such as spatial variations will now be explained with reference to FIGS. 4 and 5. FIG. 4 is a flow diagram outlining a calibration phase of the method. FIG. 5 is a flow diagram outlining a voxel writing phase.

The calibration phase of the method generates a calibration model of the type described above. The method of this example includes steps which may be iteratively repeated for N different states of the laser writing system (where $N \geq 1$). For ease of discussion, an arbitrary counter i is used to identify a current iteration.

Each iteration writes a voxel to a position in the substrate, and collects data representing photo-induced emission or light scattering resulting from the writing of the voxel. A calibration model which associates different positions (corresponding to different states of the laser writing system) with corresponding adjustments to laser pulse energy is built up using the collected data. Then, the calibration model is used to determine adjustments to apply when writing further voxels.

At block 401, a laser writing system is placed in an $i^{th}$ state. The $i^{th}$ state is a calibration state.

The $i^{th}$ state may correspond to a particular target position for a voxel within the transparent substrate. The $i^{th}$ state may further comprise a target voxel strength.

In particular, the $i^{th}$ state may comprise a state of the write head of the laser writing system. The write head comprises the optical components of the laser writing system. The optical components may be the most significant source of repeatable systematic errors.

The $i^{th}$ state may describe operating parameters of mechanical components of the laser writing system (e.g., a moveable sample stage or a moveable support for the write head). In some implementations, operating parameters of the mechanical components may be omitted.

Then, at blocks 402, 403, and 404, a voxel is formed in the transparent substrate with the laser writing system in the $i^{th}$ state; light emitted or scattered by the transparent substrate as a result of forming the voxel is detected; and it is determined whether or not the detected light satisfies a predetermined constraint. These operations may be as described with blocks 201 to 203 of FIG. 2.

Upon determining that the detected light does not satisfy the predetermined constraint, a representation of an adjustment to laser pulse energy is calculated at block 405. For example, when the amplitude of the photo-induced emission is below a predetermined target value, the adjustment may be an increase in laser pulse energy.

The amplitude of the photo-induced emission is related to the strength of the voxel formed. The adjustment may be determined based on this relationship. The relationship may be a predetermined empirical relationship, e.g. as discussed in Example 2.

The relationship may be learned by a machine learning model across two or more instances of the present method. The machine learning model may be trained by gradient descent, for example.

A predetermined empirical relationship may be used in combination with a machine learning model. For example, the machine learning model may be used for fine-tuning of the relationship.

Subsequently, at block 406, the representation of the adjustment is stored in association with a representation of the $i^{th}$ state. the state and adjustment may be incorporated into a calibration model. The state and adjustment may be stored in an associative data structure such as look-up table or dictionary. The state and adjustment may be passed as input to a machine learning model.

The $i^{th}$ iteration terminates at block 407. If a further state of the laser writing system is to be investigated, then a further state is selected at block 408, and the operations of blocks 401 to 406 are repeated for the further state.

The method of FIG. 4 may build a calibration model which associates a state of the laser writing system with a corresponding adjustment to laser pulse energy.

Data collected from multiple instances of the method may be used. For example, an average adjustment over two or more instances of a given state may be calculated and used in the calibration model.

In implementations where machine learning is used, the machine learning model may be trained by reinforcement learning. In particular, a reward function which calculates larger rewards for adjustments that more closely approach a target value may be utilized.

The calibration model generated using the method of FIG. 4 is used to determine adjustments to laser pulse energy when writing data voxels. A method of writing data voxels which makes use of the calibration model will now be described with reference to FIG. 5.

The state of the laser writing system used to write a data voxel will be referred to as a $j^{th}$ state.

At block 501, the method identifies that a voxel is to be written with the laser writing system in a $j^{th}$ state, the $j^{th}$ state having a predetermined relationship to at least one of the N states which were sampled when generating the calibration model in accordance with FIG. 4.

This operation may comprise identifying one or more of the N states which is similar to the $j^{th}$ state. States may be described as vectors, and vector distance may be used as a measure of similarity. Different parameters may be given different weights when determining similarity. For example, a parameters describing a state of an optical component of the laser write system (e.g., a beam scanner) may be weighted more highly than a parameters describing a state of a mechanical component (e.g., a sample stage).

Adjustments may be calculated based on more than one of the calibration voxels. For example, block 501 may comprise identifying two or more nearest neighbors of the $j^{th}$ state in the N calibration states.

As a more concrete example, calibration data may be collected by writing voxels to a first substrate, and data voxels may then be written to a second substrate. When writing a data voxel, it may be determined that the data voxel is to be formed at a location in the second substrate that matches the location of one of the calibration voxels written to the first substrate.

In another concrete example, the location of a voxel is described by x, y, and z coordinates. The x position is controlled by positioning a sample stage of the laser write system. The y position is controlled by an orientation of a beam scanner of the laser write system. The z position is controlled by a focus of an objective of the laser write system. It may be determined that a data voxel is to be formed using an orientation and focus (y and z positions) that match those of a calibration voxel. An adjustment may be chosen based on the measured photo-induced emission for that calibration voxel. Differences in the positioning of the sample stage (x position) may be disregarded in this example. However, movement of the sample stage provides an offset between lines of voxels, such that laser pulses are delivered to different parts of the substrate.

As will be appreciated, these concrete examples are for illustration and are not limiting.

Subsequently, at block 502, an adjustment for the $j^{th}$ state is determined based on the calibration model.

When the calibration model is a look-up table, this operation may comprise retrieving the calculated adjustment for one of the N calibration states which most closely matches the $j^{th}$ state.

When the calibration model is a machine-learning model, a representation of the $j^{th}$ state may be passed as input to the machine learning model, and the machine learning model may output the adjustment. The operations of blocks 501 and 502 may be combined in such implementations.

At block 503, the $j^{th}$ voxel is written to the transparent substrate using a laser pulse. The adjustment determined at block 502 is applied, thereby correcting for repeatable systematic errors such as spatial variations.

The method of FIG. 5 may be repeated any number of times to write any number of voxels to the transparent substrate.

The voxels may encode data. The voxels may in addition comprise voxels arranged as a fiducial mark, also referred to as a preamble.

A fiducial mark is a group of voxels arranged in a predetermined pattern. Typically, the pattern is a 1-dimensional ("1D") or 2-dimensional ("2D") pattern, though 3D patterns may alternatively be used. The predetermined pattern may for example be a Barker sequence or a Frank-Zadoff-Chu sequence. The size of the group is not particularly limited, provided that the number of voxels is large enough to allow the pattern to be identified when reading the optical data storage medium. An example 2D fiducial mark is at least 4 voxels wide by 4 voxels high.

The positions of voxels in the fiducial mark may be used as an input to a processing/decode method for recovering data from the optical data storage medium. These positional data may allow the processing/decode method to recover data more easily.

For example, when voxels are arranged in sectors, a fiducial mark having a predetermined spatial relationship to the sector may be provided. For example, the fiducial mark may be arranged along one or more edges of a sector, or at the center of the sector. This may allow the processing/decode method to distinguish sectors from one another more easily.

Since a fiducial mark comprises a predetermined pattern of voxels, a processing/decode method may use the fiducial mark to allow for correction of residual errors in voxel characteristics.

Still another use case for a fiducial mark is to allow for fine-tuning of the calibration model. Additional calibration data may be collected when writing the fiducial mark.

Voxels may be arranged in sectors, a sector being part of a layer. The 2D fiducial mark may have a predetermined spatial relationship to the sector.

In addition to repeatable systematic errors, a laser writing system may experience errors which are not repeatable or which are effectively random. The most notable source of such errors is temporal variation. For example, laser output power may vary over time, and/or heating or cooling of an optical component may cause its properties to vary.

Temporal variations may be compensated for by using feedback control. Light emission from the transparent substrate may be measured as voxels are written. When the emission intensity deviates from a predetermined target value, the amplitude of the laser pulses is adjusted to compensate for the deviation. Generally, if emission intensity falls, the amplitude of the laser pulses is increased, and vice versa. Various feedback control methods are suitable. Examples include additive-increase/multiplicative-decrease, and proportional-integral-derivative.

The predetermined target value may be based on empirical measurements of voxel quality as a function of emission intensity. One metric for voxel quality is the maximum number of bits per voxel which can be encoded and successfully recovered.

Emission intensity may be monitored continuously. Alternatively, emission intensity may be sampled at arbitrarily selected time intervals.

Figure 6A:
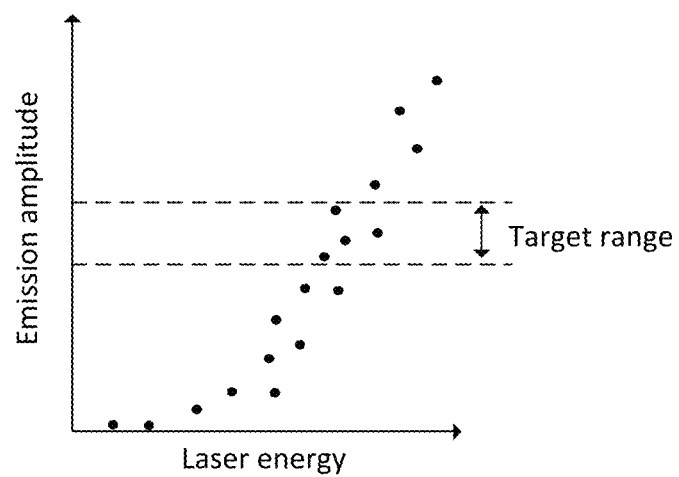
FIG. 6A is a plot of the intensity of photo-induced emission during voxel formation as a function of laser pulse energy.
Figure 6B:
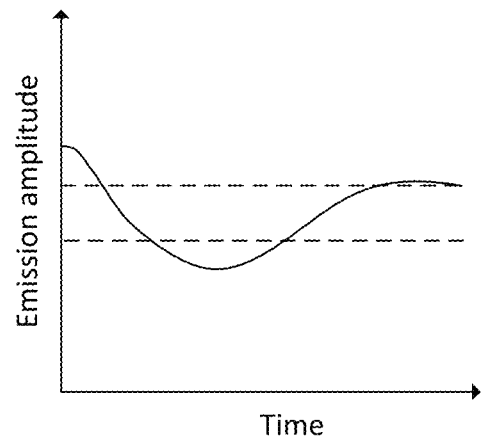
FIG. 6B shows variation photo-induced emission intensity over time in the absence of feedback control.
Figure 6C:
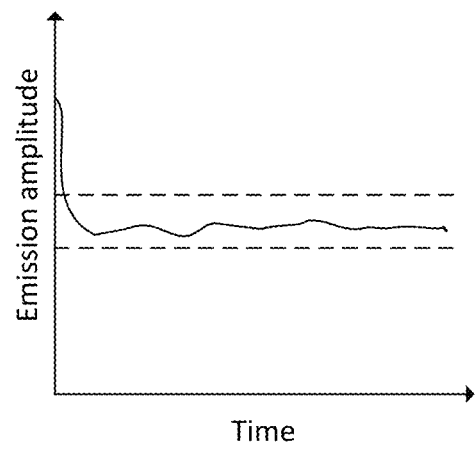
FIG. 6C shows photo-induced emission over time with feedback control.

FIGS. 6A to 6C illustrate a feedback control process.

FIG. 6A is a plot of the intensity of photo-induced emission during voxel formation as a function of laser pulse energy. The plot shows that the intensity of photo-induced emission increases with laser pulse energy, though the two are not necessarily directly proportional to one another. By measuring strengths of the written voxels, a range of photo-induced emission values which correspond to acceptable voxels is identified empirically.

FIG. 6B shows photo-induced emission intensity over time in the absence of feedback control. The emission intensity is found to deviate from the target range at certain time points, indicative of the formation of voxels with strengths outside the acceptable range.

FIG. 6C shows photo-induced emission over time when implementing feedback control. In this method, laser pulse energies are adjusted to counteract emission intensity changes over time. Emission intensity, and hence voxel strength, is maintained within the target range.

Figure 7:
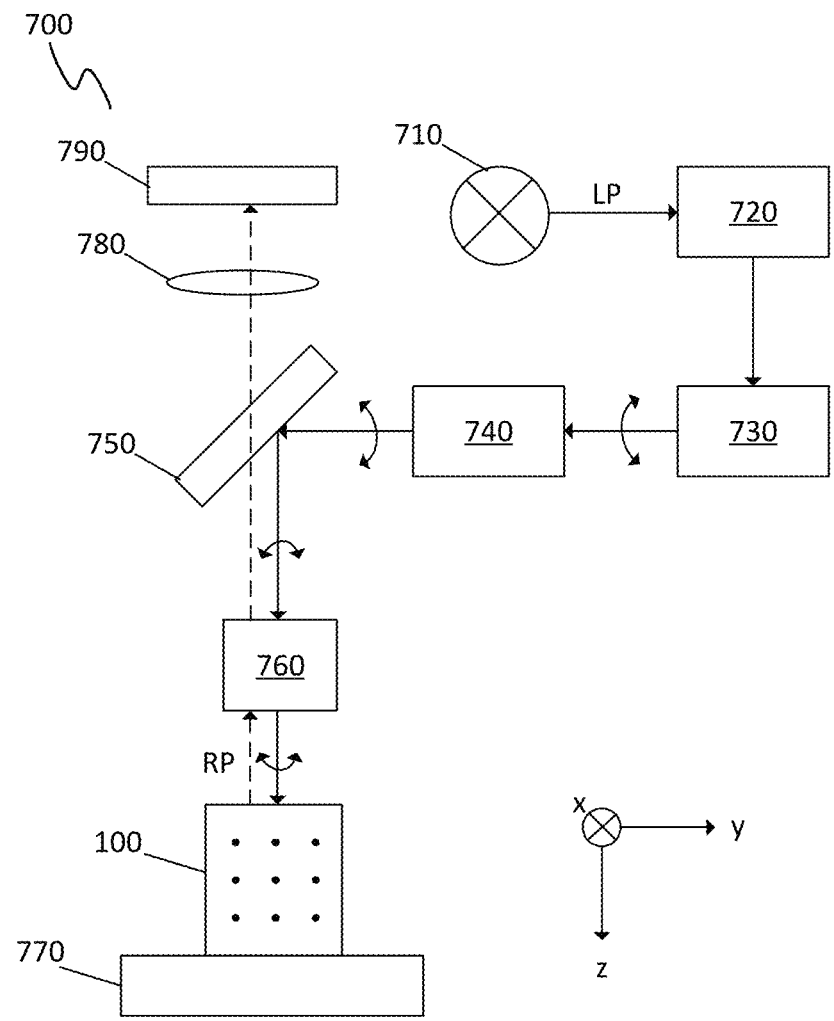
FIG. 7 is a block diagram of an example laser writing system.

An example laser writing system 700 useful in the methods described herein will now be discussed with reference to FIG. 7. FIG. 7 is a schematic block diagram of the laser writing system. A laser writing system may alternatively be referred to as a write head.

The example laser writing system 700 includes a laser source 710, an amplitude modulator 720, a scanner 730, relay optics 740, a dichroic mirror 750, an objective 760, a sample stage 770, imaging optics 780, and a photodetector 790. The figure shows the system during use, with an optical data storage medium 100 mounted on the sample stage 770.

The laser source 710 generates pulses of laser light and emits the pulses along a light path LP. Typically, the laser pulses are generated at a constant repetition rate with period tp. By way of illustration, the repetition rate may be of the order of 10 MHz. The laser light has a defined wavelength.

Laser source 710 may be a femtosecond laser.

Amplitude modulator 720 receives a laser pulse from the laser source and modulates the intensity of the laser pulse, resulting in a modulated laser pulse. The amplitude modulator is adjustable such that modulated laser pulses having a desired energy may be obtained. Where it is said that an amplitude of a laser pulse is adjusted, the adjustment may be implemented by controlling the amplitude modulator. The amplitude modulator may comprise an intensity attenuator and/or an amplifier.

An intensity attenuator may, for example, comprise an acousto-optic deflector; a liquid crystal modulator; the combination of an electro-optic modulator and a polarizer; or the combination of a Pockels cell and a polarizer. Further examples of intensity attenuators include the combination of a variable neutral density filter with a motorized stage; and the combination of a polarizer and a waveplate with a motorized stage.

Scanner 730 receives the attenuated laser pulse from the amplitude modulator, and deflects the attenuated laser pulse. The deflection angle may be swept in a reciprocating manner, resulting in the laser beam moving along a scan line. The sweep may be at a constant speed, or at a speed which varies in a known manner.

Scanner 730 may comprise a spinning polygon mirror, a resonant scanner, a micro-electromechanical system ("MEMS") mirror, a Galvano scanner, an electro-optic scanner, an acousto-optic scanner, or the like.

The scanner directs the attenuated laser pulse to relay optics 740. The relay optics 740 may comprise a scan lens, a spherical lens, and a tube lens.

After passing through relay optics 750, the attenuated laser pulse arrives at dichroic mirror 750. The dichroic mirror is configured to reflect light at the wavelength output by laser light source 710. In variants where light scattering by the substrate is to be detected, it may be desirable for the dichroic mirror to transmit a portion of the light at the wavelength output by the laser source.

The laser pulse reflected by the dichroic mirror then passes through an objective 760. The objective 760 focuses the laser pulse at a location in optical data storage medium 100.

The objective 760 may comprise one or more lenses. The objective 760 may have a variable focal depth, to allow control over the positioning of voxels in a z direction.

Optical data storage medium 100 is mounted on a sample stage 770. Sample stage 770 may move the optical data storage medium 100, for example in a y direction.

A voxel may be formed at an arbitrary location within optical data storage medium 760 based on the orientation of scanner 730, the focus of objective 760, and the position of sample stage 770.

Forming a voxel in the optical data storage medium causes photo-induced emission of light from the optical data storage medium. This light has a different wavelength to that of the laser pulses generated by laser source 710.

At least some of the emitted light travels along a return path RP. In the illustrated example, the emitted light passes through objective 760 and dichroic mirror 750, and is focused on to photodetector 790 by imaging optic 780.

Imaging optic 780 may comprise one or more lenses.

The nature of photodetector 790 is not particularly limited. Photodetector 790 may, for example, comprise a single photodiode, a photodiode array, a photomultiplier, an image sensor, or the like.

Various modifications may be made to the example system.

As an alternative to providing a movable sample stage, the sample stage may be fixed and at least the objective 760 may be mounted on an actuator which moves the objective with respect to the sample stage.

The photodetector may be arranged at any position provided that light generated by photo-induced emission as a result of formation of a voxel may be detected. For example, the photodetector may be arranged below or to the side of the optical data storage medium. In such implementations, the dichroic mirror 750 may be omitted. The laser writing system may alternatively include a color filter which prevents light at the wavelength emitted by the laser source from arriving at the photodetector.

The described example is suitable for writing phase voxels. To allow for the formation of birefringent voxels, a variant may further include a polarization state generator which modulates polarization of laser pulses delivered to the transparent substrate.

The example laser writing system delivers a single beam of laser pulses to the transparent substrate. Variants may deliver multiple beams simultaneously. For example, the laser writing system may further comprise a beam splitter which splits a laser pulse into two or more split pulses. Each split pulse may be transmitted via a respective amplitude modulator. Each amplitude modulator may be controlled independently. The pulses after modulation may be combined at a common scanner 730 with different incident angles. Downstream of the scanner, the pulses may be guided to objective 750 via relay optic 740 and focused at respective different locations in substrate 100.

The described laser writing system may be controlled by a controller to perform a method as described herein.

The controller may comprise a processor and memory storing computer executable instructions which, when executed by the processor, cause the laser writing system to perform one or more operations of a method as described herein. The controller may comprise hardware circuitry which controls the laser writing system to perform one or more operations of a method as defined herein. The controller may comprise the combination of a processor/memory and hardware circuitry.

Figure 8:
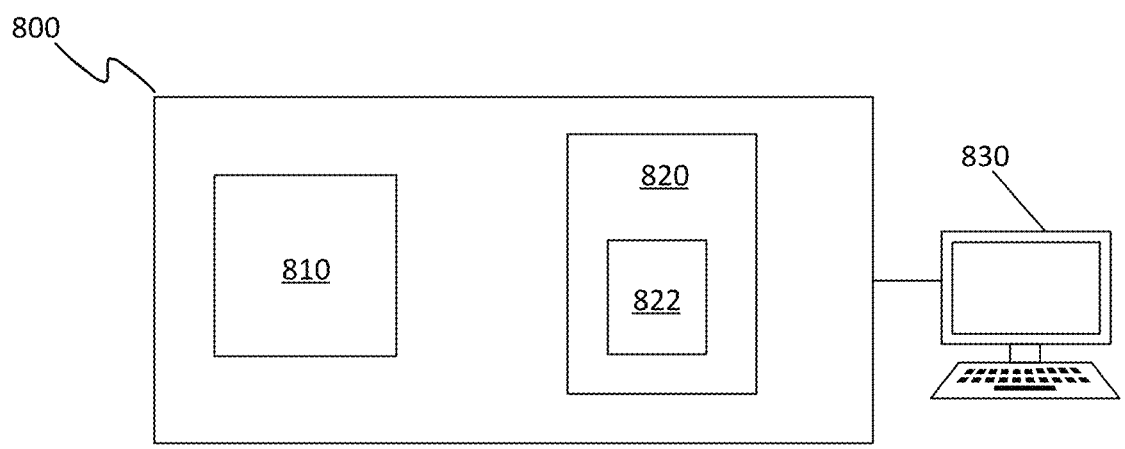
FIG. 8 is a block diagram of an example controller for a laser writing system.

An example controller 800 is illustrated in the schematic block diagram of FIG. 8.

The controller 800 includes a processing apparatus 810 which is operably linked to data storage 820 and an optional user terminal 830. The data storage 820 stores a computer program 822 for execution by the processing apparatus 810. When executed by the processing apparatus 810, the computer program 822 causes the controller 800 to perform a method as described herein. Performing the method may include communicating with and/or controlling one or more components of laser writing system 700.

The user terminal 830 may include user input equipment and a display device.

The user input equipment may comprise any one or more suitable input devices for known in the art for receiving inputs from a user. Examples of input devices include a pointing device, such as a mouse, stylus, touchscreen, trackpad and/or trackball. Other examples of input devices include a keyboard, a microphone when used with voice recognition algorithm, and/or a video camera when used with a gesture recognition algorithm.

Where reference is made herein to receiving an input from the user through the user input equipment, this may mean through any one or more user input devices making up the user input equipment.

The user input equipment may be useful for allowing a user to specify data to be encoded and written to an optical data storage medium and/or for allowing a user to specify parameters describing the optical data storage medium, such as identifying the nature of the transparent substrate material.

The display device may take any suitable form for outputting images, such as a light emitting diode (LED) screen, liquid crystal display (LCD), plasma screen, or cathode ray tube (CRT). The display device may comprise a touchscreen, and thus also form at least part of the user input equipment. A touchscreen may enable inputs by via being touched by the user's finger and/or using a stylus.

The inclusion of a display device is optional. A display device is useful in examples where it is desired to display human readable output to a user.

The processing apparatus 810 includes one or more processing units implemented in one or more dies, IC (integrated circuit) packages and/or housings at one or more geographic sites.

Each of the one or more processing units may take any suitable form known in the art, e.g. a general-purpose central processing unit (CPU), or a dedicated form of co-processor or accelerator processor such as a graphics processing unit (GPU), digital signal processor (DSP), etc. Each of the one or more processing units may comprise one or more cores.

Where it is said that a computer program is executed on the processing apparatus, this may mean execution by any one or more processing units making up the processing apparatus 810. Generally, where it is said that a calculation or determination is performed, the calculation or determination may be performed using one or more processing units.

The processing apparatus 810 typically further comprises working memory, such as random-access memory and/or one or more memory caches within the one or more processing units.

The data storage 820 comprises one or more memory units implemented in one or more memory media in one or more housings at one or more geographic sites.

Each of the one or more memory units may employ any suitable storage medium known in the art, e.g. a magnetic storage medium such as a hard disk drive, magnetic tape drive etc.; or an electronic storage medium such as a solid-state drive (SSD), flash memory or electrically erasable programmable read-only memory (EEPROM), etc.; or an optical storage medium such as an optical disk drive or glass or memory crystal-based storage, etc.

Where it is said herein that some item of data is stored in data storage 810 or a region thereof, this may mean stored in any part of any one or more memory devices making up the data storage 820.

The processing apparatus 810 and data storage 820 are operably linked. The processing apparatus and data storage are configured such that processing apparatus 810 is capable of reading data from at least a portion of data storage 820, and writing data to at least a portion of the data storage 820. The processing apparatus 810 may communicate with the data storage 820 over a local connection, e.g. a physical data bus and/or via a network such as a local area network or the Internet. In the latter case the network connections may be wired or wireless.

Example 1: Compensation for Spatial Variations

A two-dimensional array of voxels was written to a glass substrate using a laser writing system of the type described with reference to FIG. 7.

The scanner of the laser writing system was a spinning polygon scanner having 24 facets. Laser pulses were focused along scanlines in the glass 24 times per rotation of the polygon scanner. The amplitude modulator of the system was the combination of a Pockels cell and a linear polarizer.

Scanlines were oriented along a y-axis. The glass substrate was translated along an x-axis. Photo-induced emission was monitored during formation of the voxels.

Figure 9A:
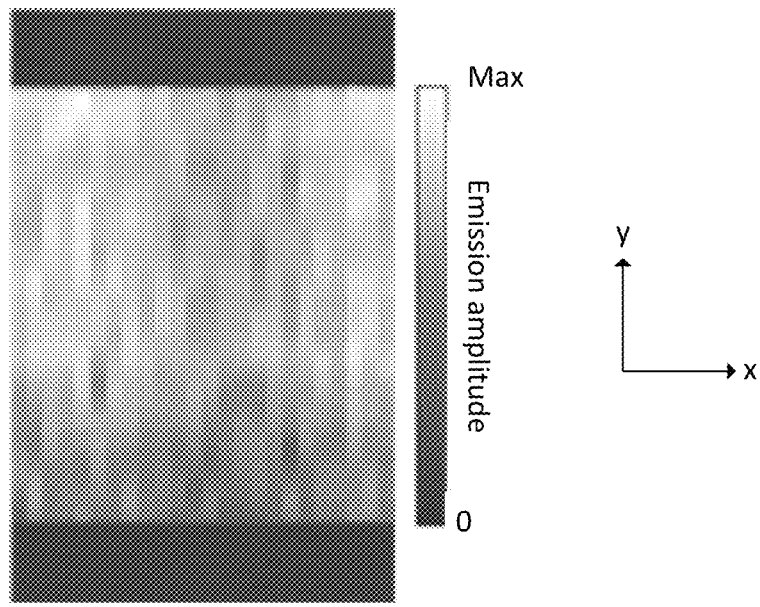
FIG. 9A is a heatmap showing observed emission intensities as a function of position when writing voxels using a method of a comparative example.

FIG. 9A shows the photoinduced emission data collected in a comparative example, without applying adjustment to laser pulse amplitudes.

Variation of emission intensities in both the y and x directions were observed. This variation caused the variations of voxel amplitudes.

It is believed that the variations in the x-direction were primarily caused by differences in reflectivity between facets of the polygon scanner ("inter-facet variation"), while the variations in the y-direction were primarily caused by the combination of variations of reflectivity within facets and differences in beam delivery to the facets ("intra-facet variation").

Figure 9B:
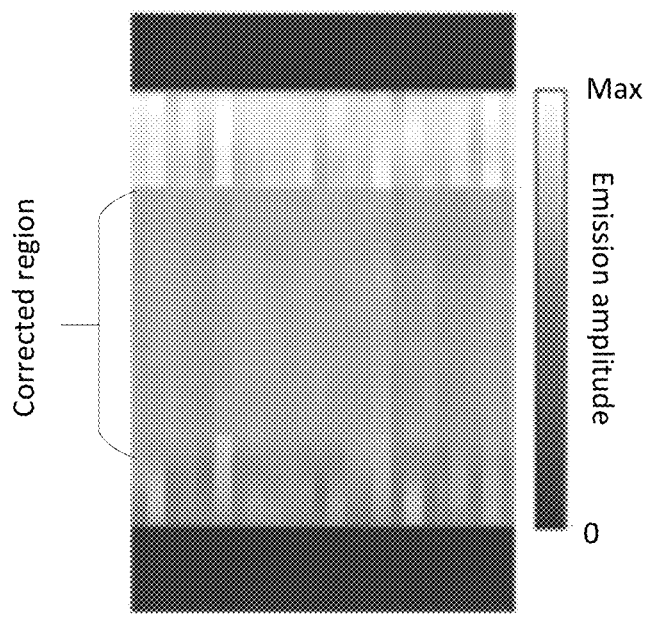
FIG. 9B is a heatmap showing observed emission intensities as a function of position when writing voxels using a method as described herein.

FIG. 9B shows photoinduced emission data collected when applying adjustments to laser pulse amplitudes. Adjustments to laser pulse intensity were applied to compensate for the spatial variations in the performance of the laser writing system. As may be seen, variations of emission amplitudes in each facet as well as inter-facet were reduced in the region where the adjustments were applied (corrected region in FIG. 9B). The adjustments enabled writing voxels of consistent amplitudes.

In this example, adjustments were calculated using the following procedure. A target emission intensity, $I_{target}$, which gave good voxel quality, was selected.

Emission intensities were measured for various different states of the laser writing system. More specifically, emission intensities at different laser pulse energies were measured for each location in each facet of the polygon scanner.

The target pulse energy $E_{target}(k, y)$ at which the emission intensity is equal to the target emission intensity, $I_{target}$, is determined for the location y in k-th facet of the polygon scanner by interpolating the measurement.

The maximum acceptable energy across all of the positions of all of the facets is chosen and denoted $E_{max}$.

When writing voxels, the amplitude of the laser light is adjusted by a transmission factor $E_{target}(k,y)/E_{max}$ where $E_{target}(k,y)$ is the target energy at the location y in the k-th facet of the polygon scanner which is currently in use. If the transmission factor is greater than 1, a transmission factor of 1 is used.

Example 2: Compensation for Temporal Variations

Figure 10:
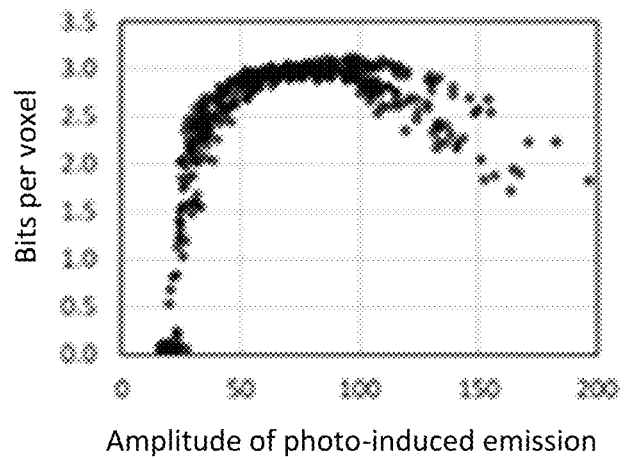
FIG. 10 is a plot showing voxel quality as a function of amplitude of photo-induced emission during voxel formation.

Voxels were written to a transparent substrate using the laser writing system described with reference to Example 1, using laser pulses of varying amplitude. The intensity of photo-induced emission was measured when forming the voxels. Voxel quality was measured by determining the number of bits per voxel ("BPV") which could be written and subsequently recovered. The results are shown in FIG. 10.

Based on the measurement, it was established that the highest-quality voxels were obtained when the photo-induced emission had a relative amplitude in the range 60 to 90. A target amplitude of 75 was selected.

Figure 11:
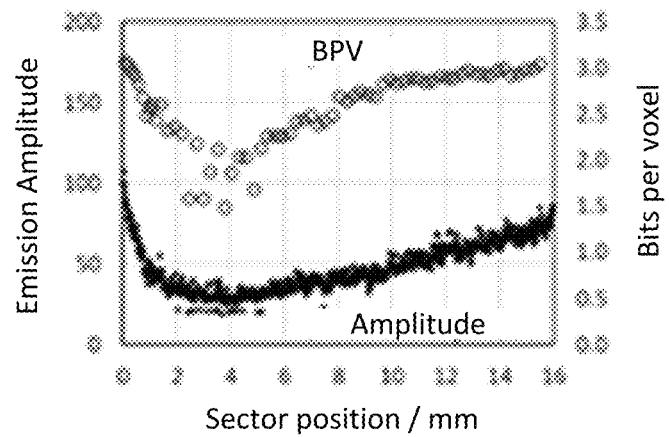
FIG. 11 is a plot showing variation of amplitude of photo-induced emission and voxel quality over time, in the absence of feedback control.

Further voxels were written to a transparent substrate, while monitoring photo-induced emission intensity and applying compensation for spatial inhomogeneity as described with reference to Example 1. Voxel quality was measured. The results are shown in FIG. 11. In FIG. 11, sector position is a proxy measurement for time, since the sample stage was translated at a constant velocity while writing the voxels.

It was found that emission amplitude and voxel quality drifted over time resulting in variations between sectors. The amplitude of photo-induced emission dropped and then gradually increased. The number of bits per voxel varied over time.

Figure 12:
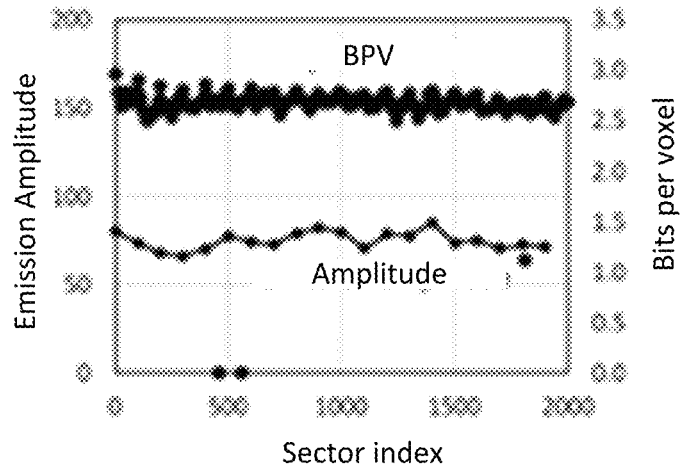
FIG. 12 is a plot showing variation of amplitude of photo-induced emission and voxel quality over time, in the presence of feedback control.

The experiment was repeated, this time additionally applying feedback control. After every 100 data sectors, the energy of the laser pulses was adjusted to bring the amplitude of photo-induced emission towards the target value. This was found to be effective for significantly reducing temporal drift in voxel quality, as illustrated by the data in FIG. 12.

Example 3: Reinforcement Learning

The calibration model may be a machine learning model. In particular, the machine learning model may be trained by Reinforcement Learning (RL).

In RL, a software agent interacts with the environment, takes actions to explore that environment, and adapts its behaviour based on feedback (or "rewards") it receives from the environment, in order to maximize its total reward (i.e., incentivise intended behaviour).

Reinforcement learning problems are typically modelled using 3 parts:
1) a state space,
2) an action space, and
3) a reward function.

Both the correction of repeatable systematic errors as described with reference to FIGS. 4 and 5, and the correction of temporal variations discussed with reference to FIGS. 6A to 6C may be addressed by the same machine learning model. This may be achieved by "live" training of the machine learning model, i.e. training the model as data are written, with the write system's behaviour being controlled by the machine learning model One example machine learning model will now be described. As will be appreciated, other models may be used.

This example is directed to a calibration model which addresses spatial variations in a laser writing system that includes a polygon scanner.

Figure 13:
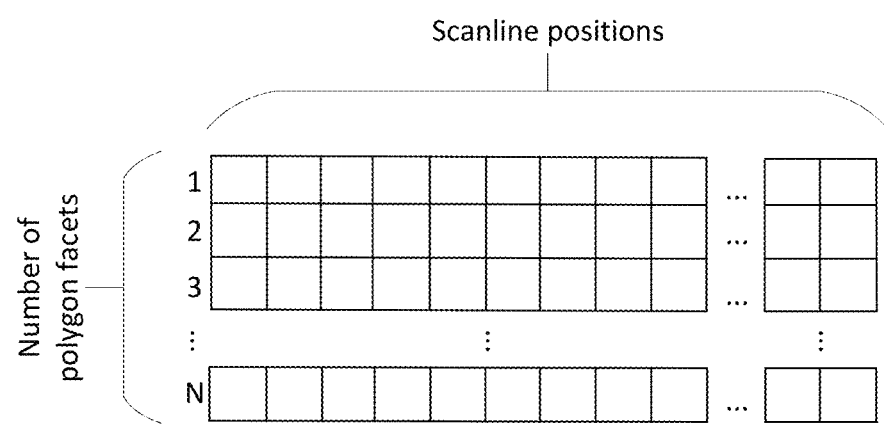
FIG. 13 is a visualisation of a state space, discussed in Example 3.

The state space can be visualized as a table, as shown in FIG. 13. The rows of the table correspond to each of N facets of the polygon scanner. The columns represent different scanlines. The model may take into account all scanlines or only a sample group of scanlines. Each entry in the table (or "bucket") holds a representation of an adjustment to laser energy.

The action space may be represented by tuples, each identifying a bucket and a possible laser energy value to use for that bucket. A NOOP ("no-operation") is allowed, i.e. the software agent may determine to make no change to a bucket.

The reward signal is a root-mean-square, RMS, error between a measured amplitude of photo-induced emission, and a predetermined target amplitude. The smaller the RMS error, the greater the value of the reward.

The system starts in a uniform state (i.e., each bucket contains the same energy value).

A policy network takes the current state as an input, and suggests an action to take. The action may be to adjust the laser energy value for a bucket.

A voxel is written using the suggested adjustment. Photo-induced emission is measured. A reward signal is calculated based on the measurement.

After a batch of several suggested actions, the policy network is updated.

Training may be performed periodically or continuously, to improve the calibration model or to update the calibration model as properties of components change over time.

It will be appreciated that the above embodiments have been described by way of example only.

More generally, according to one aspect disclosed herein, there is provided a method of writing voxels to a substrate. The method comprises forming a first voxel at a first position in a substrate using a first laser pulse; detecting light emitted or scattered by the substrate as a result of forming the first voxel; determining whether the detected light satisfies a predetermined constraint; and when the detected light does not satisfy the predetermined constraint, adjusting an amplitude of a second laser pulse. It has been found that photo-induced emission and/or changes to light scattering properties of a substrate occur when forming a voxel, and are related to voxel quality.

The first voxel may be a phase voxel, a seed modification for a birefringent voxel, or a birefringent voxel.

The second laser pulse may form a second voxel. The second voxel may be formed in the same substrate as the first voxel, or in a different substrate.

The substrate may be a transparent substrate. This may allow for the formation of multiple layers of voxels.

Detecting the light emitted or scattered by the substrate may comprise determining an intensity of the detected light. In such implementations, adjusting the amplitude of the second laser pulse may comprise adjusting the amplitude based on the intensity of the detected light.

The detecting may comprise detecting photo-induced emission from the substrate.

The method may be used to generate a calibration model for compensating for repeatable systematic errors.

For example, the method may further comprise, in response to determining that the detected light does not satisfy the predetermined constraint: calculating a value representing an adjustment to the amplitude of the second laser pulse; and storing, in association with a value representing a state of a laser writing system which formed the first voxel, the value representing the adjustment. The calculation may be performed using one or more processors and the storing may comprising storing in a memory unit.

The method may comprise writing a plurality of first voxels at a plurality of respective different locations in the transparent substrate. For each voxel of the plurality of first voxels, a value representing an adjustment to an amplitude of a second laser pulse and storing, in association with a value representing a state of a laser writing system which formed that voxel, the value representing the adjustment.

The method may result in a calibration model associating adjustment values with positions in the transparent substrate.

Adjusting the amplitude of the second laser pulse may comprise: identifying that a further voxel is to be written using a second state of the laser writing system having a predetermined relationship to the first state; and, in response, retrieving the value representing the adjustment, and applying the adjustment indicated by the value when forming the further voxel at the second position.

The predetermined relationship is that the first and second positions share a common value of an operating parameter of an optical component. For example, the optical component may be a beam scanner, and the common value of the operating parameter is a common orientation of the beam scanner.

The method may be used to compensate for temporal variations. For example, the method may include, after a predetermined time interval, forming a further voxel at a further position in a substrate using a further laser pulse; detecting further light emitted or scattered by the substrate as a result of forming the further voxel; and determining whether the detected further light satisfies the predetermined constraint. When the detected further light does not satisfy the predetermined constraint, an amplitude of a third laser pulse may be adjusted.

The third laser pulse may form a voxel. The voxel may be a phase voxel, a seed modification for a birefringent voxel, or a birefringent voxel. The voxel may be formed in the same substrate as the first voxel, or in a different substrate.

Adjusting the amplitude of a laser pulse may comprise: using a machine learning model, calculating based on a value of a parameter associated with the detected light a value encoding an adjustment to the amplitude of the light output by the laser. The machine learning model may be trained by reinforcement learning.

The method may be parallelised, with two or more instances of the method being performed simultaneously. For example, forming the first voxel may comprise forming two or more first voxels simultaneously. An instance of the detection and determining steps may be performed for each first voxel. Similarly, two or more second laser pulses may be generated in parallel, e.g. to write two or more second voxels to the substrate.

Another aspect provides a computer program product comprising instructions embodied on a non-transitory computer-readable medium which, when executed by one or more processors operably linked to a laser writing system for writing voxels to a transparent storage medium, causes the laser writing system to perform a method as defined herein. As will be appreciated, the method may be implemented using computer control. The determination step may be implemented in software, etc.

In another aspect, there is provided a laser writing system useful for implementing the method. The system may comprise: a laser source configured to emitting a laser pulse along an optical path; a first amplitude modulator configured to modulate an amplitude of a laser pulse resulting in a modulated laser pulse; a movable optic configured to direct the modulated laser pulse to a controllable position in a transparent substrate; a sample stage configured to hold a substrate on the optical path, downstream of the movable optic and amplitude modulator; a detector configured to detect light emitted or scattered by the substrate as a result of formation of a voxel in the substrate by the modulated laser pulse; and a controller, the controller being configured to control the system to perform a method as defined herein.

As will be appreciated, the method implemented by the controller may include any of the various optional steps discussed herein, in any appropriate combination.

The controller may comprise at least one processor and at least one memory. The at least one memory may store instructions which, when executed by the at least one processor, cause the processor to control the system to perform one or more operations of the method. Alternatively or additionally, the controller may comprise dedicated hardware circuitry.

The system may be configured to allow for parallelisation of the method. For example, the system may further comprise a beam splitter for splitting the laser pulse into at least a first split laser pulse and a second split laser pulse; the first amplitude modulator may be configured to modulate an amplitude of the first split laser pulse resulting in a first modulated laser pulse. The system may further comprise a second amplitude modulator configured to modulate an amplitude of the second split laser pulse resulting in a second modulated laser pulse. The system may further comprise a combining optic downstream of the first and second amplitude modulators and upstream of the movable optic, the combining optic being configured to direct the first and second modulated laser pulses to the movable optic at respective angles.

The detector may be configured to measure an intensity of the light emitted or scattered by the substrate as a result of formation of the voxel in the substrate.

The detector may be configured to detecting photo-induced emission from the transparent substrate.

The movable optic may comprise a scanner, for example a polygon scanner.

The present disclosure provides the following Clauses:

Clause 1. A method, comprising:
   forming a first voxel at a first position in a substrate using a first laser pulse;
   detecting light emitted or scattered by the substrate as a result of forming the first voxel;

determining whether the detected light satisfies a predetermined constraint;
in response to determining that the detected light does not satisfy the predetermined constraint, adjusting an amplitude of a second laser pulse.

Clause 2. The method according to Clause 1, wherein the substrate is a transparent substrate.

Clause 3. The method according to Clause 1 or Clause 2, wherein detecting the light emitted or scattered by the substrate comprises determining an intensity of the detected light.

Clause 4. The method according to Clause 3, wherein adjusting the amplitude of the second laser pulse comprises adjusting the amplitude based on the intensity of the detected light.

Clause 5. The method according to any preceding Clause, wherein the detecting comprises detecting photo-induced emission from the substrate.

Clause 6. The method according to any preceding Clause, further comprising: in response to determining that the detected light does not satisfy the predetermined constraint:
calculating a value representing an adjustment to the amplitude of the second laser pulse; and
storing, in association with a value representing a state of a laser writing system which formed the first voxel, the value representing the adjustment;
wherein adjusting the amplitude of the second laser pulse comprises:
identifying (501) that a further voxel is to be written using a second state of the laser writing system having a predetermined relationship to the first state;
based on the stored value, determining (502) an adjustment for the second state resulting in an adjusted second state.

Clause 7. The method according to Clause 6, wherein the predetermined relationship is that the first and second positions share a common value of an operating parameter of an optical component.

Clause 8. The method according to Clause 7, wherein the optical component is a beam scanner, and the common value of the operating parameter is a common orientation of the beam scanner.

Clause 9. The method according to any of Clauses 6 to 8, comprising:
writing a plurality of voxels at a plurality of respective different locations in the transparent substrate; and
for each voxel of the plurality of voxels:
performing the method as defined in claim 5 or claim 6,
resulting in a calibration model associating adjustment values with positions in the transparent substrate.

Clause 10. The method according to any preceding Clause, further comprising, after a predetermined time interval:
forming a further voxel at a further position in a substrate using a further laser pulse;
detecting further light emitted or scattered by the substrate as a result of forming the further voxel;
determining whether the detected further light satisfies the predetermined constraint;
in response to determining that the detected further light does not satisfy the predetermined constraint, adjusting an amplitude of a third laser pulse.

Clause 11. The method according to any preceding Clause, wherein adjusting the amplitude of the second laser pulse comprises:
using a machine learning model, calculating based on a value of a parameter associated with the detected light a value encoding an adjustment to the amplitude of the light output by the laser.

Clause 12. The method according to Clause 11, wherein the machine learning model is trained by reinforcement learning.

Clause 13. The method according to any preceding Clause, further comprising forming a further voxel simultaneously with the first voxel or the second voxel.

Clause 14. A computer program product comprising instructions embodied on a non-transitory computer-readable medium which, when executed by one or more processors operably linked to a laser writing system comprising a pulsed laser source, an amplitude modulator arranged to receive laser pulses from the pulsed laser source, and a photodetector, causes the laser writing system to perform a method as defined in any preceding claim.

Clause 15. A system, comprising:
a pulsed laser source;
a first amplitude modulator downstream of the pulsed laser source along an optical path, the first amplitude modulator configured to modulate an amplitude of a laser pulse from the pulsed laser source resulting in a modulated laser pulse;
a beam scanner arranged on the optical path downstream of the first amplitude modulator;
a sample stage to hold a substrate on the optical path downstream of the movable optic and amplitude modulator;
a detector to detect light emitted or scattered by the substrate as a result of formation of a voxel in the substrate; and
a controller to control the system to perform a method comprising:
forming a first voxel at a first position in a substrate using a first laser pulse;
detecting light emitted or scattered by the substrate as a result of forming the first voxel;
determining whether the detected light satisfies a predetermined constraint;
in response to determining that the detected light does not satisfy the predetermined constraint, adjusting an amplitude of a second laser pulse.

Clause 16. The system according to Clause 15, wherein the controller comprises at least one processor and at least one memory.

Clause 17. The system according to Clause 15 or Clause 16, further comprising:
a beam splitter arranged between the pulsed laser source and the first amplitude modulator;
a second amplitude modulator arranged on a parallel optical path to the first amplitude modulator; and
a combining optic downstream of the first and second amplitude modulators and upstream of the movable optic, the combining optic being configured to direct the first and second modulated laser pulses to the movable optic at respective angles.

Clause 18. The system according to any of Clauses 15 to 17, wherein the method further comprises:
in response to determining that the detected light does not satisfy the predetermined constraint:
calculating a value representing an adjustment to the amplitude of the second laser pulse; and storing, in association with a value representing a state of a laser writing system which formed the first voxel, the value representing the adjustment;
wherein adjusting the amplitude of the second laser pulse comprises:
identifying that a further voxel is to be written using a second state of the laser writing system having a predetermined relationship to the state; and
in response, retrieving the value encoding the adjustment, and applying the adjustment when forming the further voxel at the second position.

Clause 19. The system according to any of Clauses 15 to 18, wherein adjusting the amplitude of the second laser pulse comprises:
using a machine learning model, calculating based on a value of a parameter associated with the detected light a value encoding an adjustment to the amplitude of the light output by the laser.

Clause 20. The system according to any of Clauses 15 to 20, wherein the method further comprises, after a predetermined time interval:
forming a further voxel at a further position in a substrate using a further laser pulse;
detecting further light emitted or scattered by the substrate as a result of forming the further voxel;
determining whether the detected further light satisfies the predetermined constraint;
in response to determining that the detected further light does not satisfy the predetermined constraint, adjusting an amplitude of a third laser pulse.

Clause 21. The system according to any of Clauses 15 to 20, wherein the detector is configured to measure an intensity of the light emitted or scattered by the substrate as a result of formation of the voxel in the substrate.

Clause 22. The system according to any of Clauses 15 to 21, wherein the detector is configured to detect photo-induced emission from the transparent substrate.

Clause 23. The system according to any of Clauses 15 to 22, wherein the movable optic comprises a polygon scanner.

Claim 24. The system according to any of Clauses 15 to 23, wherein adjusting the amplitude of the light output by the laser comprises adjusting the amplitude based on the intensity of the detected light.

Other variants or use cases of the disclosed techniques may become apparent to the person skilled in the art once given the disclosure herein. The scope of the disclosure is not limited by the described embodiments but only by the accompanying claims.

The invention claimed is:

1. A method, comprising:
forming a first voxel at a first position in a substrate using a first laser pulse;
detecting light emitted or scattered by the substrate as a result of forming the first voxel;
determining whether the detected light satisfies a predetermined constraint;
in response to determining that the detected light does not satisfy the predetermined constraint, adjusting an amplitude of a second laser pulse.

2. The method according to claim 1, wherein the substrate is a transparent substrate.

3. The method according to claim 1, wherein detecting the light emitted or scattered by the substrate comprises determining an intensity of the detected light.

4. The method according to claim 3, wherein adjusting the amplitude of the second laser pulse comprises adjusting the amplitude based on the intensity of the detected light.

5. The method according to claim 1, wherein the detecting comprises detecting photo-induced emission from the substrate.

6. The method according to claim 1, further comprising:
in response to determining that the detected light does not satisfy the predetermined constraint:
calculating a value representing an adjustment to the amplitude of the second laser pulse; and
storing, in association with a value representing a first state of a laser writing system which formed the first voxel, the value representing the adjustment;
wherein adjusting the amplitude of the second laser pulse comprises:
identifying that a further voxel is to be written using a second state of the laser writing system having a predetermined relationship to the first state;
based on the stored value, determining an adjustment for the second state resulting in an adjusted second state.

7. The method according to claim 6, wherein the predetermined relationship is that the first position and a second position in the substrate share a common value of an operating parameter of an optical component.

8. The method according to claim 7, wherein the optical component is a beam scanner, and the common value of the operating parameter is a common orientation of the beam scanner.

9. The method according to claim 6, comprising:
writing a plurality of voxels at a plurality of respective different locations in the substrate; and
for each voxel of the plurality of voxels:
performing the method as defined in claim 6,
resulting in a calibration model associating adjustment values with positions in the substrate.

10. The method according to claim 1, further comprising, after a predetermined time interval:
forming a further voxel at a further position in the substrate using a further laser pulse;
detecting further light emitted or scattered by the substrate as a result of forming the further voxel;
determining whether the detected further light satisfies the predetermined constraint;
in response to determining that the detected further light does not satisfy the predetermined constraint, adjusting an amplitude of a third laser pulse.

11. The method according to claim 1, wherein adjusting the amplitude of the second laser pulse comprises:
using a calibration model, calculating based on a value of a parameter associated with the detected light a value encoding an adjustment to the amplitude of the light output by the laser.

12. The method according to claim 11, wherein the calibration model comprises a machine learning model that has been trained by reinforcement learning using a reward function based at least upon adjustments to an amplitude of a laser pulse and corresponding detected light emitted or scattered by the substrate.

13. The method according to claim 1, further comprising forming a further voxel simultaneously with the first voxel.

14. A computer program product comprising instructions embodied on a non-transitory computer-readable medium which, when executed by one or more processors operably linked to a laser writing system comprising a pulsed laser source, an amplitude modulator arranged to receive laser pulses from the pulsed laser source, and a photodetector, causes the laser writing system to perform a method comprising:

forming a first voxel at a first position in a substrate using a first laser pulse;

detecting, using the photodetector, light emitted or scattered by the substrate as a result of forming the first voxel;

determining whether the detected light satisfies a predetermined constraint;

in response to determining that the detected light does not satisfy the predetermined constraint, adjusting an amplitude of a second laser pulse.

15. A system, comprising:
a pulsed laser source;
a first amplitude modulator downstream of the pulsed laser source along an optical path;
a beam scanner arranged on the optical path downstream of the first amplitude modulator;
a sample stage to hold a substrate in the optical path downstream of the beam scanner and amplitude modulator;
a detector to detect light emitted or scattered by the substrate as a result of formation of a voxel in the substrate; and
a controller to control the system to perform a method comprising:
forming a first voxel at a first position in the substrate using a first laser pulse;
detecting light emitted or scattered by the substrate as a result of forming the first voxel;
determining whether the detected light satisfies a predetermined constraint;
in response to determining that the detected light does not satisfy the predetermined constraint, adjusting an amplitude of a second laser pulse.

16. The system according to claim 15, wherein the controller comprises at least one processor and at least one memory.

17. The system according to claim 15, further comprising:
a beam splitter arranged between the pulsed laser source and the first amplitude modulator;
a second amplitude modulator arranged on a parallel optical path to the first amplitude modulator; and
a combining optic downstream of the first and second amplitude modulators and upstream of a movable optic, wherein in use the combining optic directs first and second modulated laser pulses to the movable optic at respective angles.

18. The system according to claim 15, wherein the method further comprises:
in response to determining that the detected light does not satisfy the predetermined constraint:
calculating a value representing an adjustment to the amplitude of the second laser pulse; and
storing, in association with a value representing a state of a laser writing system which formed the first voxel, the value representing the adjustment;
wherein adjusting the amplitude of the second laser pulse comprises:
identifying that a further voxel is to be written using a second state of the laser writing system having a predetermined relationship to the state; and
based on the stored value, determining an adjustment for the second state resulting in an adjusted second state.

19. The system according to claim 15, wherein adjusting the amplitude of the second laser pulse comprises:
using a calibration model, calculating based on a value of a parameter associated with the detected light a value encoding an adjustment to the amplitude of the light output by the laser.

20. The system according to claim 15, wherein the method further comprises, after a predetermined time interval:
forming a further voxel at a further position in the substrate using a further laser pulse;
detecting further light emitted or scattered by the substrate as a result of forming the further voxel;
determining whether the detected further light satisfies the predetermined constraint;
when the detected further light does not satisfy the predetermined constraint, adjusting an amplitude of a third laser pulse.

* * * * *